United States Patent
Nakano et al.

(10) Patent No.: US 9,404,167 B2
(45) Date of Patent: Aug. 2, 2016

(54) PRODUCTION OF NANO SIZED FERRITE COMPRISING OXIDIZING A MOLTEN SLAG

(75) Inventors: Anna Nakano, Albany, OR (US); Seshadri Seetharaman, Täby (SE); Volodymyr Shatokha, Dnipropetrovsk (UA)

(73) Assignee: Jernkontoret, Stockholm (SE)

(*) Notice: Subject to any disclaimer, the term of this patent is extended or adjusted under 35 U.S.C. 154(b) by 514 days.

(21) Appl. No.: 13/821,635

(22) PCT Filed: Sep. 7, 2011

(86) PCT No.: PCT/SE2011/051078
§ 371 (c)(1),
(2), (4) Date: Sep. 11, 2013

(87) PCT Pub. No.: WO2012/033454
PCT Pub. Date: Mar. 15, 2012

(65) Prior Publication Data
US 2015/0307957 A1  Oct. 29, 2015

(30) Foreign Application Priority Data

Sep. 10, 2010  (SE) ...................................... 1050944

(51) Int. Cl.
*C21C 7/00* (2006.01)
*B22F 9/02* (2006.01)
(Continued)

(52) U.S. Cl.
CPC .............. *C22B 7/04* (2013.01); *C01G 49/0072* (2013.01); *C01P 2004/62* (2013.01); *C01P 2006/42* (2013.01); *Y02P 10/212* (2015.11)

(58) Field of Classification Search
CPC ........... C01G 49/0009; C01G 49/0018; C01G 49/0036; C01G 49/0072; C21C 7/0075

USPC ............ 266/137, 161; 75/319, 230, 232, 233, 75/235, 746, 751, 954; 419/19, 20
See application file for complete search history.

(56) References Cited

U.S. PATENT DOCUMENTS 4,001,011 A * 1/1977 Agarwal et al. ................. 75/500
4,185,997 A   1/1980 Inoue et al.
(Continued)

FOREIGN PATENT DOCUMENTS

CN   101830691   9/2010
CN   101830692   9/2010
(Continued)

OTHER PUBLICATIONS

Semykina et al., "Confocal Microscopic Studies on Evolution of Crystals During Oxidation of the FeO—CaO—SiO2—MnO Slags", Metallurgical and Materials Transactions B, vol. 41B, pp. 940-945, Oct. 2010.
Amighian et al., "Preparation of nano-sized manganese ferrite (MnFe2O4) via coprecipitation method", Physica status solidi. (c), vol. 3, pp. 3188-3192, Sep. 2006 (full article and abstract).
(Continued)

*Primary Examiner* — Holly Le
(74) *Attorney, Agent, or Firm* — Morgan, Lewis & Bockius LLP

(57) ABSTRACT

Method for producing nano sized ferrite particles from a metallurgical slag, the method including the steps of: a) providing a ladle with a molten slag including CaO, SiO2, FeO, and at least one of MnO, Cr2O3, V2O3. b) oxidizing the slag at a temperature in the interval of 1573K-1773K (1300-1500° C.) for 10-90 minutes, c) removing at least a portion of the slag from the ladle d) cooling the removed slag portion to a temperature below 373K (100° C.), e) extracting nano sized manganese ferrite and/or chromium ferrite and/or vanadium ferrite particles from the cooled portion.

14 Claims, 8 Drawing Sheets

(51) Int. Cl.
*C22B 7/04* (2006.01)
*C01G 49/00* (2006.01)

(56) References Cited

U.S. PATENT DOCUMENTS

| | | | |
|---|---|---|---|
| 5,736,111 | A | 4/1998 | Saegusa |
| 6,277,171 | B1 * | 8/2001 | Mantel ............................ 75/453 |
| 8,696,976 | B2 | 4/2014 | Morgenstern |
| 2003/0190471 | A1 * | 10/2003 | Carpenter et al. ............ 428/402 |
| 2004/0244534 | A1 * | 12/2004 | Kojo et al. ...................... 75/643 |
| 2008/0003159 | A1 * | 1/2008 | Cheon et al. .................. 423/263 |
| 2011/0274580 | A1 * | 11/2011 | Deegan et al. ................ 420/591 |

FOREIGN PATENT DOCUMENTS

| | | |
|---|---|---|
| JP | S52-88201 | 7/1977 |
| JP | S52-125493 | 10/1977 |
| JP | S54-56996 | 5/1979 |
| JP | H09-48618 | 2/1997 |
| JP | H11-323447 | 11/1999 |
| JP | 2011-529794 | 12/2011 |

OTHER PUBLICATIONS

Semykina et al., "Recovery of iron and manganese values from metallurgical slags by the oxidation route", Doctoral Thesis, Royal Institute of Technology, Stockholm, Sweden, Oct. 2010.
International Search Report dated Feb. 14, 2012 for International application No. PCT/SE2011/051078.
Office Action for Chinese Patent Application No. 201180053746.3, dated May 6, 2014.
Semykina, "Confocal Microscopic Studies on Evolution of Crystals During Oxidation of the FeO—CaO—$SiO_2$—MnO Slags", Process Metallurgy and Materials Processing Science; Metallurgical and Materials Transactions B, vol. 41, No. 5, pp. 940-945 (2010).
Amighian, "Preparation of nano-sized manganese ferrite ($MnFe_2O_4$) via coprecipitation method", phys. stat. sol. (c) 3, No. 9, 3188-3192 (2006).
Notice of Reason for Rejection (with English Translation) for Japanese Patent Application No. 2013-528167, dated Aug. 25, 2015.
Second Office Action (with English Translation) for Chinese Patent Application No. 201180053746.3, dated Dec. 18, 2014.

* cited by examiner

XRD pattern, a- manganese ferrite, b- calcium silicate

XRD pattern, a- manganese ferrite, b- calcium silicate

XRD pattern, a- manganese ferrite, b- calcium silicate

XRD pattern, a- manganese ferrite, b- calcium silicate

XRD pattern, a- manganese ferrite, b- calcium silicate

PRODUCTION OF NANO SIZED FERRITE COMPRISING OXIDIZING A MOLTEN SLAG

TECHNICAL FIELD

The present invention relates methods for the production of nano sized ferrite particles, in particular manganese ferrite and/or chromium ferrite and/or vanadium ferrite.

BACKGROUND

The major waste product from the steelmaking practice is slag. In iron- and steelmaking, nearly 12 Mt of steelmaking slag is produced every year in Europe (around 50 Mt in the world). The most widespread approach to recover the values existing as inclusions in the slag matrix in steelmaking slags is to crush the slag at ambient temperature, separate metallic iron by magnetic separation and recycle the same by introducing it in steelmaking process. The remains are often used as filling materials in road and waterway construction. A significant amount of the slag remains in dumps, which damages the environment and requires a land for secure storage.

The article "Confocal Microscopic Studies on Evolution of Crystals During Oxidation of the FeO—CaO—SiO2-MnO Slags", Metallurgical and Materials Transactions B, suggested that MnFe2O4 and Fe3O4 could be recovered from slags comprising FeO, CaO, SiO2 and MnO under oxidizing conditions. MnFe2O4 and Fe3O4 were found to precipitate as spinels in sizes between 1-50 μm.

A number of methods to produce nano sized spinel-type manganese ferrite have been suggested. For instance Nano-sized manganese ferrite (MnFe2O4) powder has been synthesized via coprecipitation method, using FeSO4.7H2O and MnSO4.H2O as starting materials. No methods have been suggested to produce nano sized spinel-type manganese ferrite from metallurgical slags.

OBJECT OF THE INVENTION

One object of the invention is to recover values from slags, in particular slags comprising FeO and oxides of Mn and/or Cr and/or V.

Another object of the invention is to provide a method to produce nano sized manganese ferrite powder and/or chromium ferrite and/or vanadium ferrite.

DESCRIPTION OF THE INVENTION

At least one for these objects are met by providing a first method to produce nano sized ferrite particles from a metallurgical slag. The method including the steps of:
a) providing a ladle with a molten slag including CaO, SiO2, FeO, and at least one of MnO, Cr2O3, V2O3.
b) oxidizing the slag at a temperature in the interval of 1573K-1773K (1300-1500° C.) for 10-90 minutes,
c) removing at least a portion of the slag from the ladle.
d) cooling the removed slag portion to a temperature below 373K (100° C.),
e) extracting nano sized manganese ferrite and/or chromium ferrite and/or vanadium ferrite particles from the cooled portion.

Such slags can be obtained from steel production. The slag can be provided in liquid phase by directly separating it from a steel melt or as cold slag that is reheated to molten state. For such production the slag preferably comprises in weight %: 20-50 CaO, 10-40 SiO2, 10-40 FeO and 5-20 MnO, and/or Cr2O3, and/or V2O3. The composition is dependent of which kind of steels are produced, and which furnaces and process are used.

In a preferred embodiment manganese ferrite is produced and the slag comprises in weight %: 20-50 CaO, 10-40 SiO2, 10-40 FeO and 5-20 MnO.

The atmosphere during step b) is preferably air, however an atmosphere with lower oxygen partial pressure may also be used, even though a higher oxygen partial pressure is preferred. Thus, preferably the atmosphere has an oxygen partial pressure of at least $10^{-5}$ atm, more preferably at least $10^{-1}$ atm, most preferably air is used.

To increase contact with oxygen and inhibit growth of spinels the slag can be stirred during the oxidation step b).

An oxidizing gas, preferably air, can be blown towards the surface of the slag and/or bubbled through the slag during step b).

In the following description the first method is exemplified by the production of nano sized manganese ferrite from slag containing MnO. However, nano sized chromium ferrite and/or nano sized vanadium ferrite may be produced applying the same principles.

During the oxidation of molten CaO—FeO—SiO2-MnO manganese ferrite spinels can form from the following reaction:

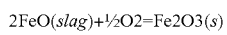

$$2FeO(slag) + \tfrac{1}{2}O_2 = Fe_2O_3(s)$$

$$Fe_2O_3(s) + MnO = MnFe_2O_4(s)$$

Figure 1:
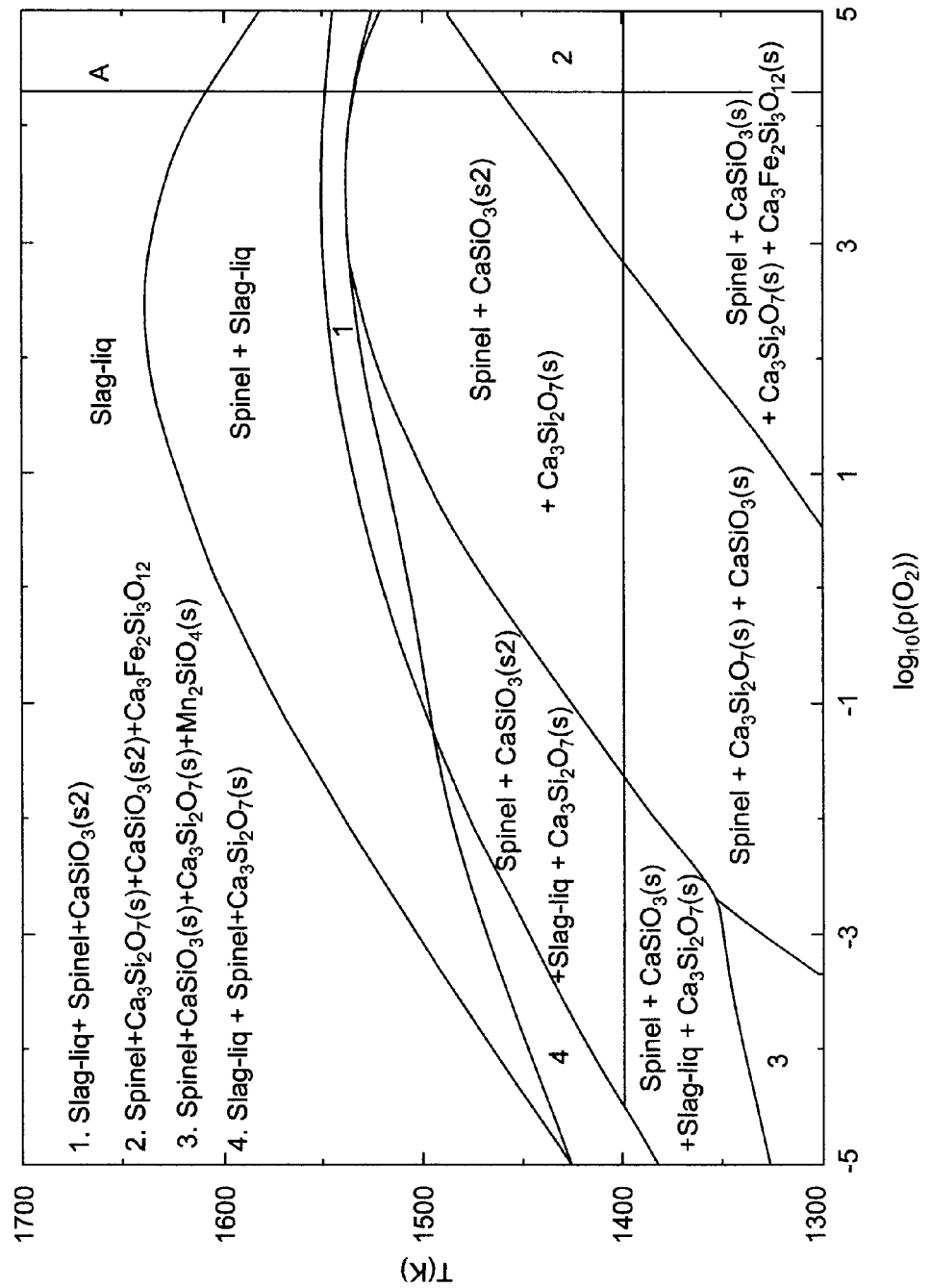
FIG. 1 shows a temperature-partial pressure of oxygen phase diagram for composition 1 in table 1, calculated by FactSage 6.1 where a line marked (A) corresponds to the partial pressure of oxygen in air. P(O2) presented in Pa
Figure 2:
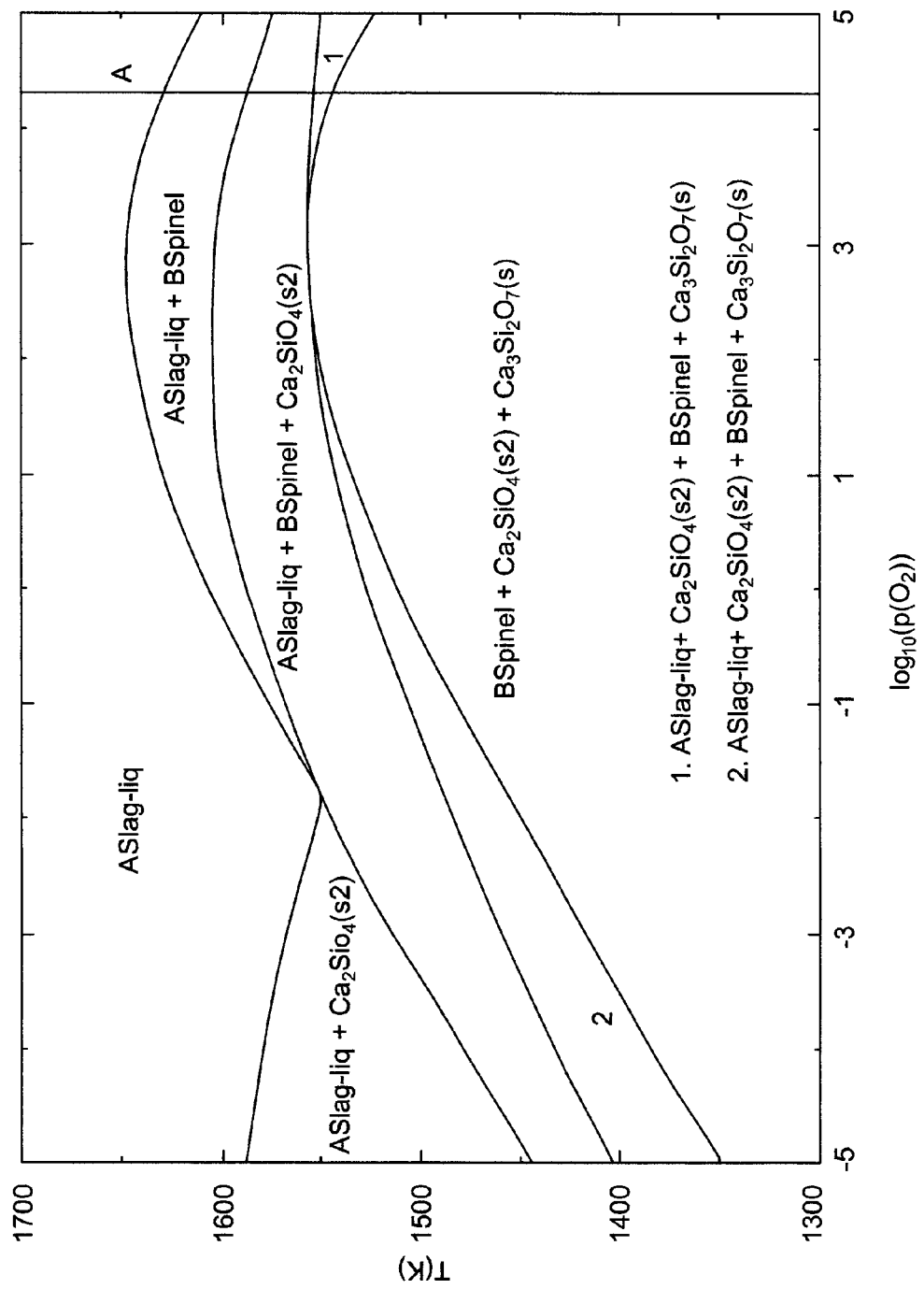
FIG. 2 shows a temperature-partial pressure of oxygen phase diagram for composition 2 in table 1, calculated by FactSage 6.1 where a line marked (A) corresponds to the partial pressure of oxygen in air. P(O2) presented in Pa.

The spinels start to precipitate in the region "Spinel+Slag-liq", see FIGS. 1 and 2. The spinels grow and float on top of the slag (at the slag/gas interface). However, if the slag is stirred and oxidizing gas is bubbled through the slag the spinels may also grow within the slag. Preferably, a crossed electric and magnetic field can be applied to the slag, directed to move magnetic or weakly magnetic particles to towards the surface. This will increase concentration of iron oxides and manganese oxide at the surface and thereby the formation of spinels at the surface is facilitated. Also MnFe2O4 that has been formed within the slag will be drawn towards the surface.

Thus preferably a crossed electric and magnetic field is applied before step c), preferably during step b), both fields aligned substantially parallel to the slag surface and directed to move magnetic or weakly magnetic particles in the slag towards the surface of the slag. In the following step c) the top layer where the magnetic or weakly magnetic particles have accumulated is removed (i.e. a portion of the slag). How much of the top layer is removed is dependent of factors such as oxidation time, concentration of MnO and FeO in the slag, and can be from a few centimeters up to 20-30 centimeters. When using shorter oxidation times, e.g. 10-20 minutes, a thinner top layer can be removed, than when using longer oxidation times, e.g. 20-40 minutes.

After removal of the top layer, the oxidation of the slag can be repeated as well as the applying of the crossed electric and magnetic field, and followed by once more removing the top layer. This procedure can be repeated until substantially all or a desired amount of manganese ferrite has been extracted from the slag. Each repeated oxidation can be of different duration.

The magnetic field is preferably within the range of 0.5-10 T. Metallurgical slags have a specific electrical conductivity of 100-120 Sm/m, and can act as electrolytes with ionic conductivity. Hence the electric field can be created by providing two spaced electrodes in the ladle for applying a voltage potential. The optimum parameters for the system can be chosen by industry corresponding to the plant needs. The possible use of supermagnets could provide a magnetic field up to 10 T. However, weaker magnets which can create magnetic field 0.5-3 T could also be used instead of supermagnets. Materials for the electrodes can be chosen specific to the melt considered and the solid phase separated at a given temperature. Applied potential on the electrodes will depend on the electrical conductivity of the molten slag, but is preferably in the range of 5-50V.

The removed top portion is preferably quenched in a water bath, preferably having a temperature in the range of 283K-223K (10-50° C.). However other means of cooling/quenching the top layer may be used. To prevent growth of the spinels the cooling rate is preferably at least 3°/s down to a temperature of 1273K (1000° C.), more preferably at least 5°/s.

The cooled portion/top layer can optionally be grinded while being in the water bath to provide a slurry comprising manganese ferrite. The slurry is also likely to comprise calcium silicates and other precipitated phases and is therefore preferably subjected to a magnetic separation process to extract manganese ferrite particles, which are soft magnetic at room temperature. At room temperature the manganese ferrite particles are magnetically stronger than at high temperatures such as in the molten slag. Therefore it can be enough to only apply a magnetic field and to direct the particles do a desired location in a container holding the slag where they can be collected. Optionally a cross electric and magnetic field can be applied.

Alternatively, it would also be possible to not apply a crossed electric and magnetic field to the molten slag and instead of removing the top layer one or several times, the entire slag can be quenched. In such case the oxidation time is preferably 30-90 minutes to ensure that most of the slag has been oxidized. Also stirring and bubbling oxidizing gas into the slag is desired in this alternative. The quenched slag can then be grinded, preferably in water to form a slurry, from which the manganese ferrite particles can be magnetically separated.

The spinels are mainly in the form of $MnFe_2O_4$, but if for instance $Al_2O_3$ and $MgO$ are present in the slag, $MgFe_2O_4$, $MnAl_2O_4$ may also form. These spinels are however non magnetic and $MnFe_2O_4$ can therefore be magnetically separated there from. The same is true for $Fe_2O_3$ and calcium silicates. To some extent spinels of $Fe_3O_4$ may form, but at basicity in the range 1-3 $MnFe_2O_4$ is dominating. For most applications $Fe_3O_4$ particles do not need to be separated from $MnFe_2O_4$ particles, rather the manganese material may include up to 10% by weight of other nano sized soft magnetic materials such as $Fe_3O_4$. However, if desired they could be separated by using differential magnetic fields.

The relation between CaO and $SiO_2$ is called basicity, and is defined as $B=CaO/SiO_2$. Basicity of the slag affects the formation of spinels. As was found in the example 1, basicity affects size of the particles drastically. It is therefore preferred that the basicity of the slag is adjusted to be in the range of 1-3, preferably 1.5-2.5, more preferably 1.8-2.5. If basicity is too low CaO can be added, and if basicity is too high $SiO_2$ can be added.

The slag may in some applications include up to 10% by weight of $Al_2O_3$ and MgO, but usually lower than 5% by weight or less, if any. $Al_2O_3$ can compete with $Fe_2O_3$ to form a spinel phase with manganese $MnAl_2O_4$; but this will not be magnetic. MgO can compete with MnO to form $MgFe_2O_4$, but will neither be magnetic. $Al_2O_3$ is amphoteric and will not significantly affect the effect of $CaO/SiO_2$ ratio. Thus $MnAl_2O_4$ and $MgFe_2O_4$ can be separated from the nano sized manganese ferrite particles by using magnetic separation techniques.

The amounts of FeO and MnO is preferably adjusted for optimal formation of manganese ferrite. As described above $Al_2O_3$ and MgO may compete with the iron and manganese, e.g. forming $MgFe_2O_4$, $MnAl_2O_4$. After adjusting for competing elements the optimal mole ratio between Mn and Fe is preferably adjusted to be around 2. In some cases it can be desired with even a higher ratio to ensure that as much as possible of the manganese reacts to form manganese ferrite, since manganese is a more expensive element than iron.

We also propose an alternative second method of producing manganese ferrite powder having an average particle size below 50 nm by using the following steps:
  a) providing iron (II) oxalate dehydrate and manganese (II) oxalate in amounts corresponding to mole ratio between iron and manganese in the range of 1.5-2.5, preferably 2-2.2,
  b) mixing and dissolving the provided iron (II) oxalate dehydrate and manganese (II) oxalate in water, and
  c) evaporating the water from solution of step b) to provide a dried mixture,
  d) heat treating the dried mixture of step c) at a temperature above 500 but not higher than that the mix remains in solid state, during a time period in the range of 0.5-10 hours, while having a neutral or oxidizing atmosphere.

Preferably in step d) the temperature is in the interval 600-700 C, the atmosphere is oxidizing. Preferably, the duration of the heat treatment is in the range of 1-4 hours, more preferably 2-3 hours.

The two methods described above could be used to produce nano sized ferrite particles having an average particle size in the range of 10-1000 nm, preferably in the range of 10-500 nm, more preferably in the range of 10-100 Nm, even more preferably 15-50 nm, most preferably 15-30 nm.

We also suggest a magnetic separation process for separating magnetic or weakly magnetic particles from a slag or slurry in a container wherein the slag or slurry is subjected to a cross electric and magnetic field, the magnetic field accomplished by at least one magnet outside the container and providing a magnetic field in the range of 0.5-10 T, and the electric field accomplished by applying a voltage in the range of 5-50 V, over two spaced apart electrodes in the container, preferably the electrodes are located at opposite sides of the container, the magnetic or weakly magnetic particles being collected at a side of the container to which they are accumulated by the cross electric and magnetic field.

Example 1

A synthetic slag was produced by mixing "FeO" powder, CaO powder, SiO2 powder, and MnO powder. In order to synthesize wüstite "FeO", appropriate amounts of iron (<10 μm, purity of 99.9+%) and Fe2O3 (<5 μm, purity of 99+%) powders, supplied by Sigma Aldrich Chemie, Germany, were carefully mixed so that the final composition would correspond to that of "FeO" in equilibrium with iron at 1273K (1000° C.). Other materials used in the slag preparation, CaO powder with a purity of 99.9%, SiO2 powder with a purity of 99.5% and MnO powder with a purity of 99.5% were also supplied by Sigma Aldrich Chemie (Germany). SiO2 powder was dried for 24 hours at 1073K (800° C.) and CaO powder at 1273K (1000° C.) for 2 hours in an Ar atmosphere prior to mixing. Each sample was mixed well to obtain homogeneity. The chemical compositions of the samples used in the experiments are presented in Table 1.

TABLE 1

Chemical compositions of synthetic slags used

| | Composition weight % | | | | Basicity | FeO/ |
|---|---|---|---|---|---|---|
| No | CaO | SiO2 | FeO | MnO | (B) | MnO |
| 1 | 27.5 | 27.5 | 30 | 15 | 1.0 | 2 |
| 2 | 33 | 22 | 30 | 15 | 1.5 | 2 |
| 3 | 37 | 18 | 30 | 15 | 2 | 2 |

Figure 3:
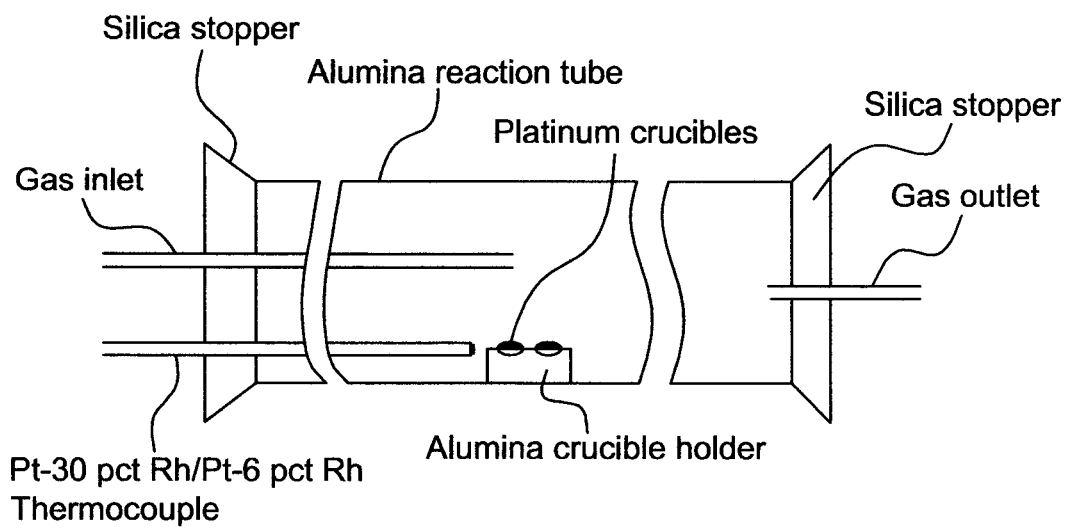
FIG. 3 shows the furnace setup of Example 1
Figure 4:
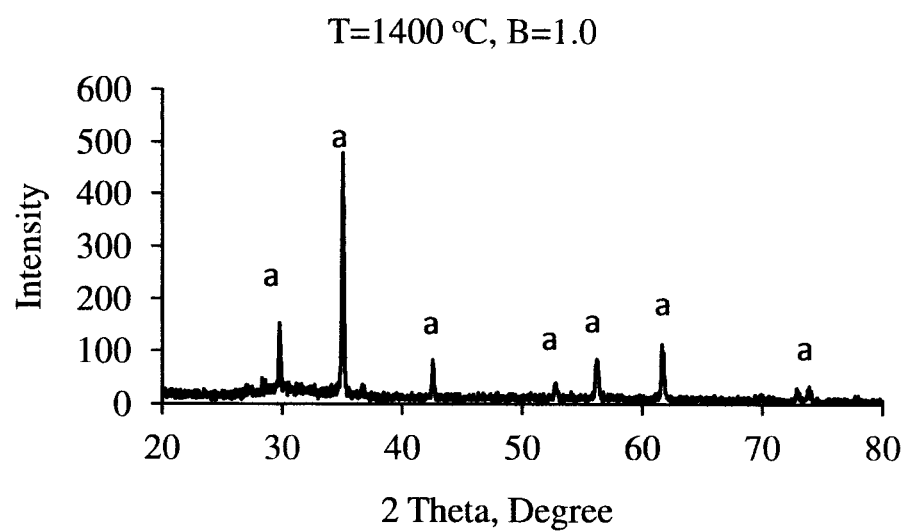
FIG. 4 shows XRD pattern analysis for composition 1 at 1673 K (1400° C.)
Figure 5:
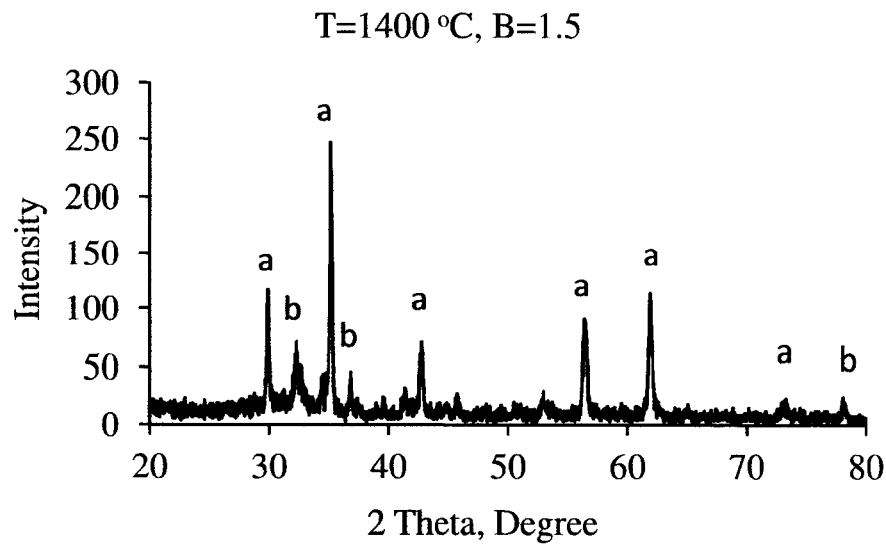
FIG. 5 shows XRD pattern analysis for composition 2 at 1673 K (1400° C.)
Figure 6:
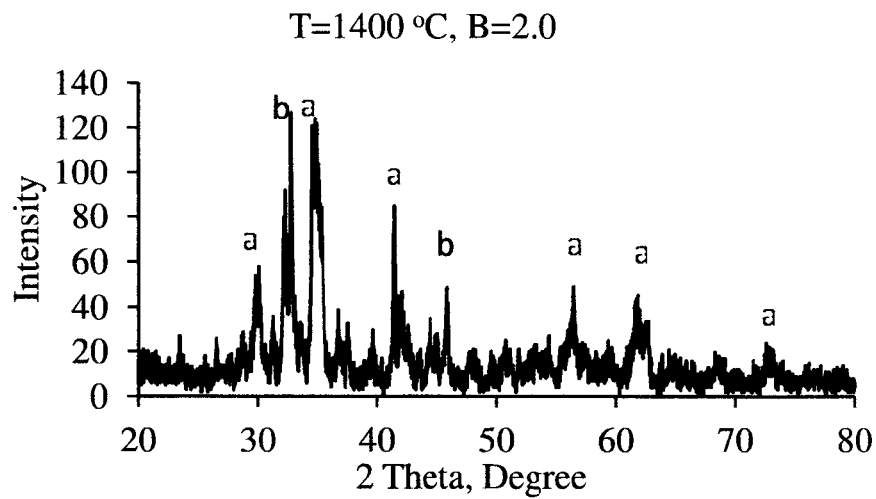
FIG. 6 shows XRD pattern analysis for composition 3 at 1673K (1400° C.)
Figure 7:
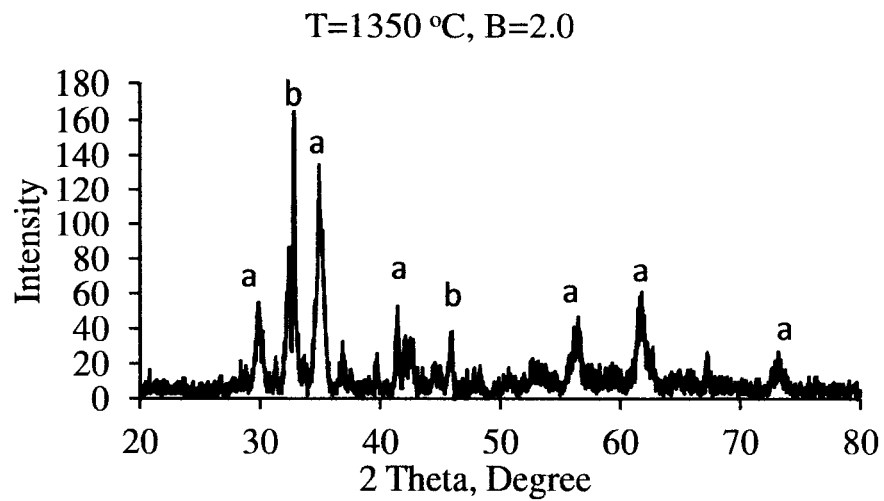
FIG. 7 shows XRD pattern analysis for composition 3 at 1623K (1350° C.)
Figure 8:
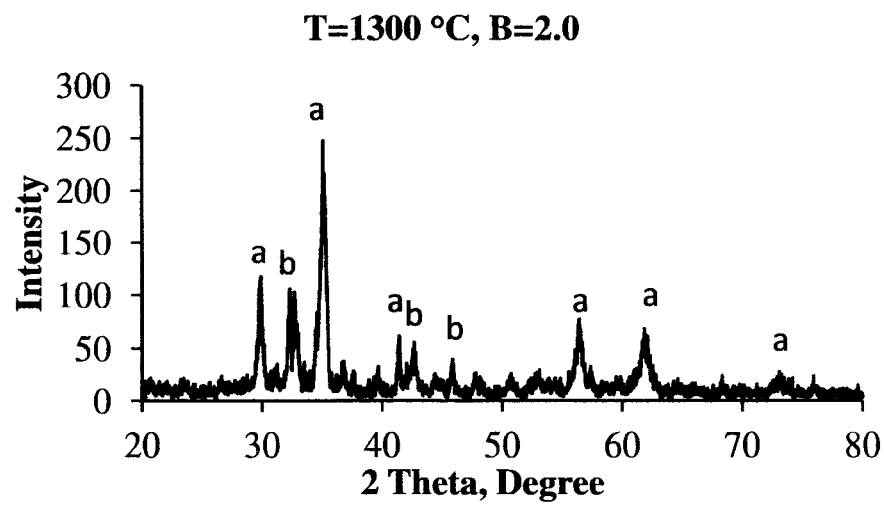
FIG. 8 shows XRD pattern analysis for composition 3 at 1573K (1300° C.)

The furnace arrangement used in the present experiments is presented in FIG. 3. Platinum crucibles with 10.0 mm inner diameter and a height of 8.0 mm, made from platinum foil (supplied by "Alfa Aesar" Germany) with 0.1 mm thickness and 99.99% purity, were used as the containers for the slag samples. The pre-mixed slag samples in platinum crucibles were placed in an alumina holder and positioned in the even temperature zone of the furnace. In all the experiments, the same level of slag in the crucible was maintained so that the results are comparable. In order to ensure homogeneity, the slags were premelted in argon atmosphere. The oxygen impurity in the argon gas was removed by using copper turnings at 973 K (700° C.) so that the oxygen levels in the gas was close to the oxygen potential corresponding to the FeO activities in the molten slags so that neither oxidation or reduction of FeO occurred. The slags were soaked at the experimental temperature for at least 30 min. before the oxidant gas was introduced. No mass change could be noticed during the heating period. Ar was then replaced by an oxidant gas (air in the present examples) flowing at a rate of 0.4 l/min. The temperature of the furnace was controlled by a programmable EUROTHERM 2408 regulator with a Pt-30 pct Rh/Pt-6 pct Rh thermocouple as a sensor to an accuracy of less than 3K. The samples were maintained at the aimed temperature for 30 min. After the experiments, the samples were cooled in the furnace in an argon atmosphere at a maximum possible rate, viz. 40 K/min. Quenched samples were analysed by XRD using a Siemens D5000 X-ray unit with a copper Kα X-ray source.

The basicity as well as the temperature effect on the manganese ferrite formation was analyzed. The XRD pattern for all the samples showed the presence of manganese ferrite (see FIGS. 4-8). With increasing basicity, calcium silicate, as a separate phase, was observed.

In order to investigate a growth trend of manganese ferrite, particle sizes were estimated using the Scherrer formula for the X-Ray particle size determination $-L=k\lambda/(B \cos x/2)$. Where L is the liner dimension of the particle, k a numerical constant for which Scherrer obtained the value $2(\ln 2/\pi)^{0.5}=0.93$, λ the wavelength of the incident X-rays (1.54 Å), B the half-value breadth of the diffracted beam, x/2 is the Bragg's angle.

The particle size was found to be dependent on the basicity of the sample. With increasing basicity, the size of the manganese ferrite particles decreased from 125 nm at basicity 1 to 25 nm at basicity 2.

With decreasing temperatures, the particle size also decreased. For the basicity equal to two, the calculated manganese ferrite size was approximately 25 nm (see Table 2) in the temperature range 1573 K (1300° C.) to 1673 K (1400° C.).

TABLE 2

Average manganese ferrite size as a function of basicity and temperature.

| Sample No | Basicity (B) | Experimental temperature, K(° C.) | Average size, nm (L) |
|---|---|---|---|
| 1 | 1 | 1673(1400) | 124.7 |
| 2 | 1.5 | 1673(1400) | 84.4 |
| 3 | 2 | 1673(1400) | 25.5 |
| 3 | 2 | 1623(1350) | 24.4 |
| 3 | 2 | 1573(1300) | 23.3 |

Conclusions of Example 1

The precipitation of nano-manganese ferrite from the CaO—FeO—SiO2-MnO slag system during oxidation was investigated. Experiments were conducted in a horizontal resistance furnace in an oxidizing atmosphere (air). The XRD analysis of the final product showed the presence of manganese ferrite for all the experimental samples. The manganese ferrite particle size was calculated using the Scherrer formula. The basicity showed to have an influence on the particle size. At basicity equal to 1 the average manganese ferrite particle size was determined to be 125 nm, with increasing basicity of the sample, the particle size of manganese ferrite was decreased and at basicity of 2 was as small as 25 nm.

Example 2

Example 2 shows another method for producing nano sized manganese ferrite. Iron (II) oxalate dehydrate (99.999% metal basis) and Manganese (II) oxalate dehydrate (Mn 30% minimum) were supplied by Alfa Aesar, Germany. The starting materials Fe(C2O4)2H2O and Mn(C2O4)2H2O were dissolved in double distilled water and mixed well at an appropriate ratio corresponding to the reaction (1).

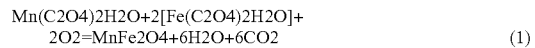

$$Mn(C2O4)2H2O+2[Fe(C2O4)2H2O]+2O2=MnFe2O4+6H2O+6CO2 \qquad (1)$$

A mixed oxalate water solution was heated to 373K to evaporate the solvent water. The dried mixture was kept in a Pt-crucible and was introduced into a muffle furnace kept at 923K in air. After 2 and 3 hours, the Pt-crucible was removed from the furnace and allowed to cool rapidly to room temperature. The product obtained was a dark fine powder.

The manganese ferrite powder thus synthesized was analyzed by XRD. A Siemens D5000 X-ray unit with a copper Kα X-ray source was used. SEM analysis was carried out in a JEOL SEM unit. The particle size was evaluated by using the Scherrer formula under the assumption that particles are spherical.

The saturation magnetisation (Ms), remaining magnetization (Mr) and coercivity (Hc) were measured using VSM (Model 155, EG&G Princeton Applied Research) at room temperature (300 K).

Figure 9:
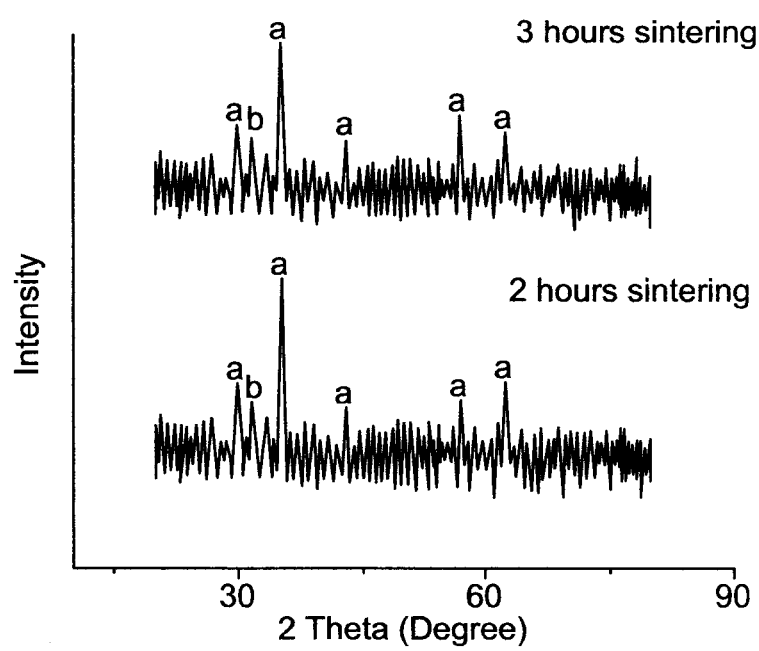
FIG. 9 shows XRD patterns for the synthesized manganese ferrites of example 2

FIG. 9 shows the XRD patterns for the product of synthesis, sintered at 923K for 2 and 3 hours. Most of the peaks in the diffractogram showed that the product was mainly MnFe2O4 (with a spinel structure). One peak of Mn3O4/Fe2O3 (indistinguishable between the two pure oxides) was found. The intensity of this peak was found to decrease with increasing sintering time.

The particle size of MnFe2O4 calculated by the Scherrer formula was found to be 25 nm and 30 nm for the samples sintered for 2 hours and 3 hours, respectively.

Figure 10A:
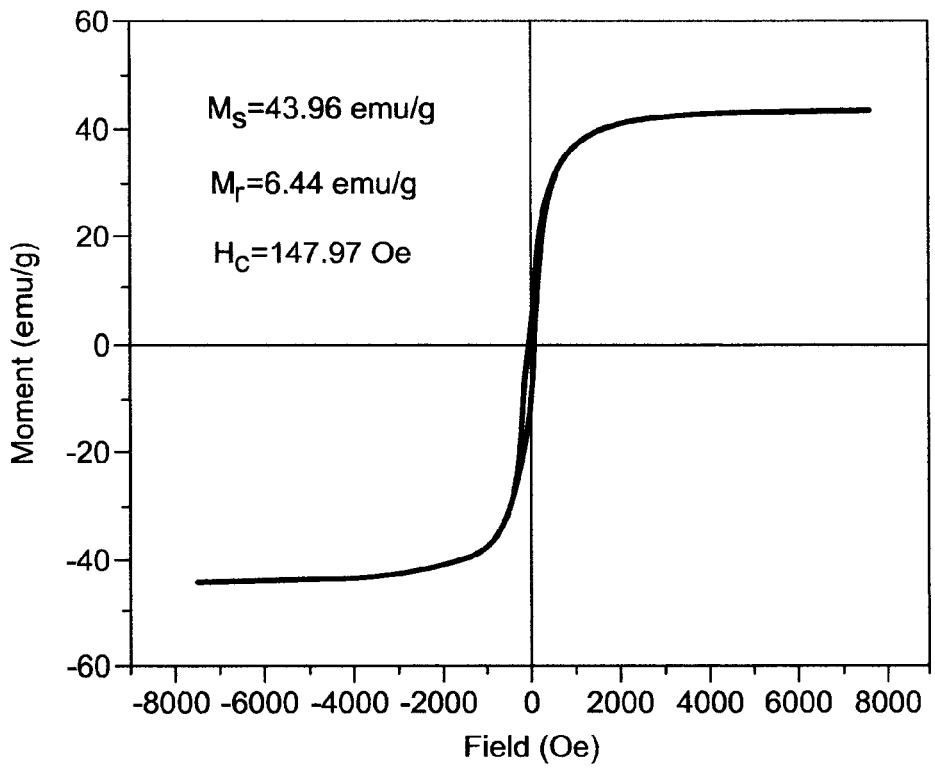
FIG. 10 shows hysteresis loops measured at 300 K (23° C.) for the synthesized manganese ferrites of example 2
Figure 10B:
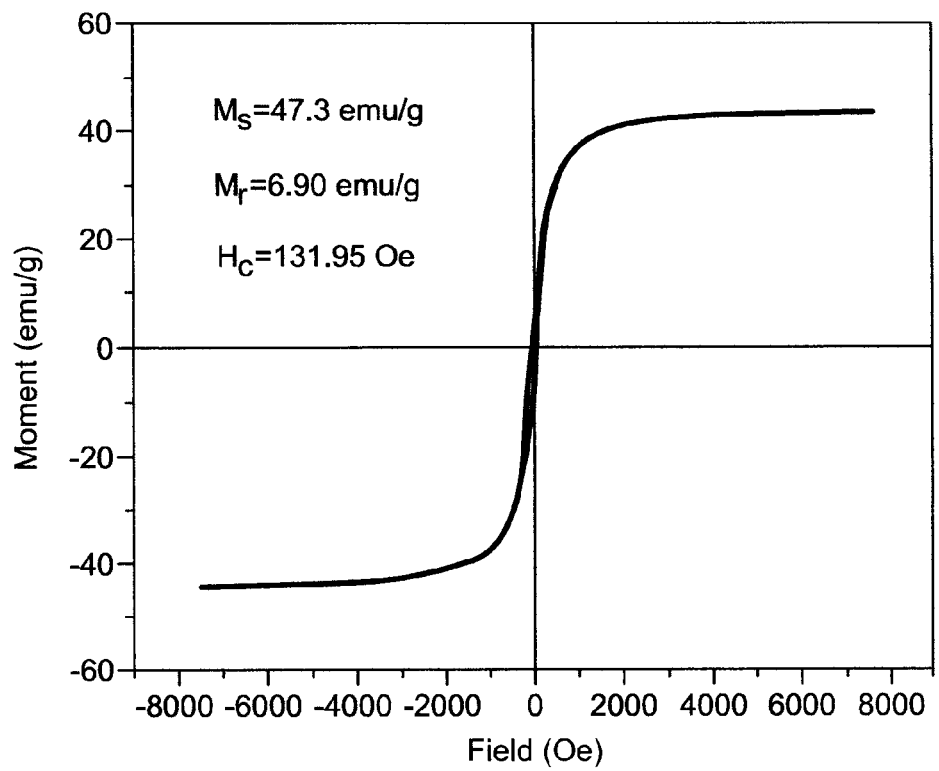

Room-temperature hysteresis loops for synthesized manganese ferrite are shown in FIG. 10. It can be seen in this figure that the MnFe2O4 obtained is a soft ferromagnet. The field dependence of the magnetization at 300 K shows 6.44 emu/g remanence (Mr) for the 25 nm particles, which slightly increases to 6.90 emu/g for the 30 nm particles. The saturation magnetization (Ms) increases with increasing particle size and decreasing coercivity (Hc). The present results show that the magnetic property of manganese ferrite is independent of the synthesis route adopted. The nano-manganese ferrite obtained from metallurgical slags is also likely to be a soft ferromagnet, with similar saturation magnetization, coercivity and remanence as for the synthesized manganese ferrite.

The invention claimed is:

1. Method for producing nano sized ferrite particles from a metallurgical slag, the method including the steps of:
   a) providing a ladle with a molten slag including CaO, $SiO_2$, FeO, and at least one of MnO, $Cr_2O_3$, $V_2O_3$,
   b) oxidizing the slag at a temperature in the interval of 1573K-1773K (1300-1500° C.) for 10-90 minutes,
   c) removing at least a portion of the slag from the ladle,
   d) cooling the removed slag portion to a temperature below 373K (100° C.), and
   e) extracting nano sized manganese ferrite and/or chromium ferrite and/or vanadium ferrite particles from the cooled portion.

2. Method for producing nano sized ferrite particles according to claim 1 wherein the slag is stirred during the oxidation step b).

3. Method for producing nano sized ferrite particles according to claim 1 wherein an oxidizing gas is blown towards the surface of the slag and/or bubbled through the slag during step b).

4. Method for producing nano sized ferrite particles according to claim 1 wherein a magnetic field is applied before step c), the field aligned substantially parallel to the slag surface and directed to move magnetic or weakly magnetic particles in the slag towards the surface of the slag, and wherein step c) includes removing the top layer of the slag where the magnetic or weakly magnetic particles have accumulated.

5. Method for producing nano sized ferrite particles according to claim 4 wherein the magnetic field is within the range of 0.5-10 T.

6. Method for producing nano sized ferrite particles according to claim 4 comprising, after removal of the top layer, repeating the oxidation of the slag and the applying of the magnetic field for accumulation of remaining magnetic or weakly magnetic particles towards the surface of the slag, followed by once more removing of the top layer, which procedure can be repeated until substantially all or a desired amount of magnetic or weakly magnetic particles have been extracted from the slag.

7. Method for producing nano sized ferrite particles according to claim 1 wherein the slag is provided in a slag ladle in molten state directly from a steel melt.

8. Method for producing nano sized ferrite particles according to claim 1 wherein the basicity of the slag is adjusted to be in the range of 1-3, by adding CaO to the slag if basicity is too low and by adding $SiO_2$ to the slag if basicity is too high.

9. Method for producing nano sized ferrite particles according to claim 1 wherein the amounts of FeO and MnO is adjusted for optimized formation of $MnFe_2O_4$, so that when compensating for competing elements, the ratio between Fe and Mn is adjusted to be around 2.

10. Method for producing nano sized ferrite particles according to claim 1 wherein the cooling rate in step d) is at least 3°/s down to a temperature of 1273K (1000° C.).

11. Method for producing nano sized ferrite particles according to claim 1 wherein the cooling is done by putting the portion to be cooled in a water bath, and wherein the cooled portion is optionally grinded while being in the water bath to provide a slurry comprising manganese ferrite and/or chromium ferrite and/or vanadium ferrite and to some extent non desired precipitated phases.

12. Method for producing nano sized ferrite particles according to claim 11 wherein the slurry is subjected to a magnetic separation process to extract manganese ferrite and/or chromium ferrite and/or vanadium ferrite particles from the slurry and collecting the particles.

13. Method for producing nano sized ferrite particles according to claim 12 wherein the magnetic separation process applies a magnetic field of at least 0.5 T.

14. Method for producing nano sized ferrite particles according to claim 1 wherein the slag includes in weight %:
   20-50 CaO,
   10-40 $SiO_2$,
   10-40 FeO, and
   5-20 MnO and/or $Cr_2O_3$, and/or $V_2O_3$.

* * * * *